United States Patent [19]

Nieminen et al.

[11] Patent Number: 4,973,533

[45] Date of Patent: Nov. 27, 1990

[54] GAS VAULT STRUCTURE FOR A STORAGE BATTERY

[75] Inventors: Jukka-Pekka Nieminen; Asko Mäisti; Toivo Kärnä, all of Porvoo; Ahti Kemppi, Järvelä ; Esko Savolainen, Hollola; Niilo Jääskö, Porvoo, all of Finland

[73] Assignee: Neste Oy, Finland

[21] Appl. No.: 364,798

[22] Filed: Jun. 9, 1989

[30] Foreign Application Priority Data

Jun. 9, 1988 [FI] Finland .................................. 882729

[51] Int. Cl.$^5$ ......................... H01M 2/12; H01M 2/18
[52] U.S. Cl. ........................................ 429/82; 429/88; 429/177
[58] Field of Search ...................... 429/82, 86, 88, 177

[56] References Cited

U.S. PATENT DOCUMENTS

| | | |
|---|---|---|
| 3,194,687 | 7/1965 | Shannon ............................... 429/82 |
| 3,630,786 | 12/1971 | Nishimura ........................ 429/82 X |
| 4,278,742 | 7/1981 | Oxenreider et al. .................. 429/88 |
| 4,444,853 | 4/1984 | Halsall et al. .................... 429/177 X |

Primary Examiner—Stephen J. Kalafut
Attorney, Agent, or Firm—Steinberg & Raskin

[57] ABSTRACT

The present invention concerns a gas vault structure for a storage battery having one or several cells enclosed in a housing, each cell containing electrolyte and monopolar plates and/or bipolar plates separated from one another by separator plates and coated with positive and/or negative mass, along with requisite electrical connectors interconnecting cells and/or plates. The gas vault structure is arranged to serve as an inner core for producing a gas space during casting of the housing of the storage battery, and/or of the cover, and/or of the partitions separating the cells.

7 Claims, 6 Drawing Sheets

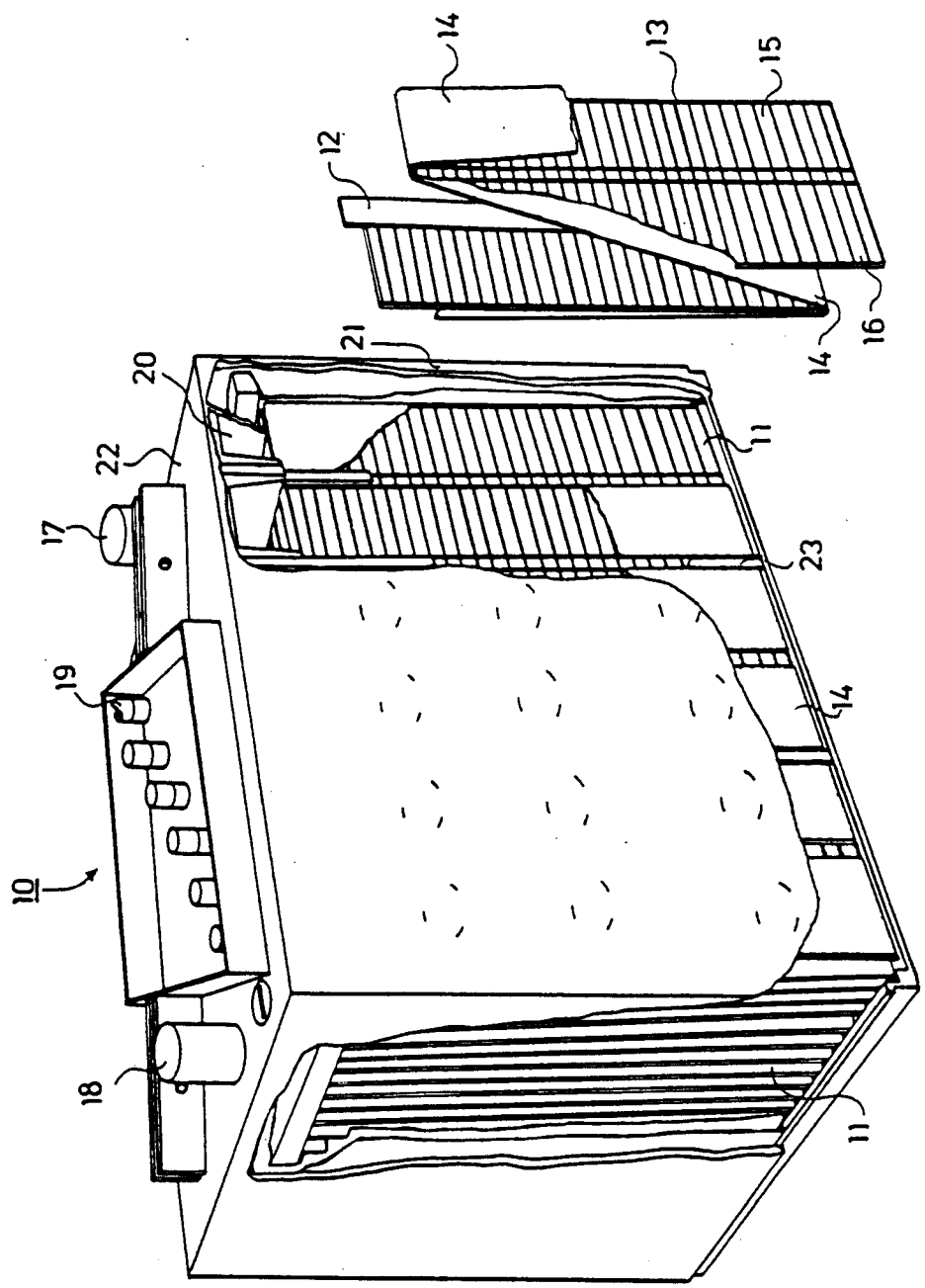

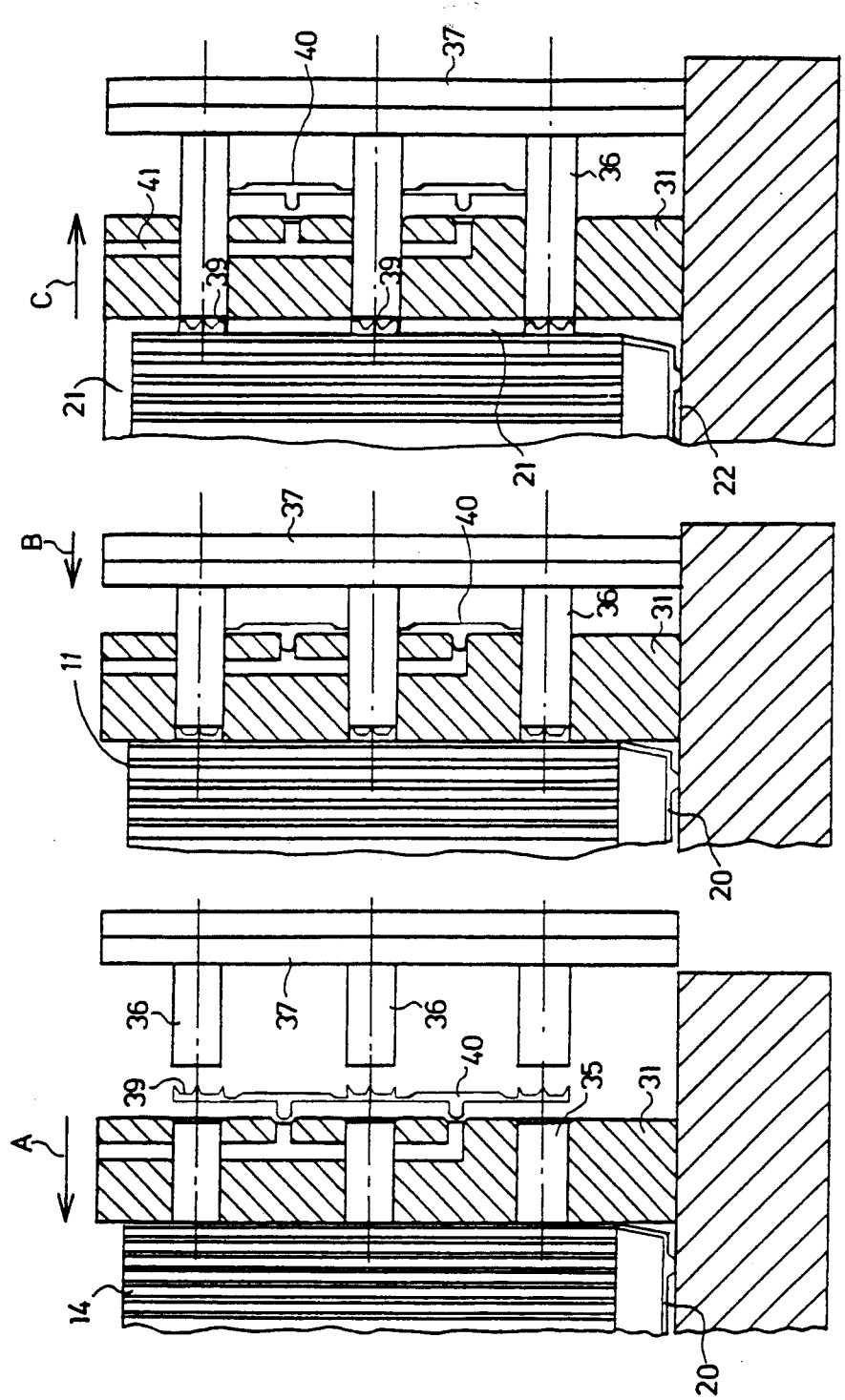

GAS VAULT STRUCTURE FOR A STORAGE BATTERY

BACKGROUND OF THE INVENTION

The present invention concerns a gas vault structure for a storage battery comprising one or several cells enclosed in a housing, each cell containing electrolyte and monopolar plates and/or bipolar plates separated by separator plates and coated with positive and/or negative active mass, along with requisite electrical connectors interconnecting the cells and/or plates.

The storage battery is conventionally produced so that the cells are stacked into a box provided with partitions and, as the final phase of battery production, a cover is fixed on top of the box so that the electrolyte solution will not leak from one compartment into another, or out therefrom.

In the designs known in the art, the gas space is generally produced with the aid of the battery housing and a cover. Therefore, the gas space comprises the upper part of the battery housing which is closed by the cover. In the known design, the housing and the cover of the battery must be welded together, usually by mirror-welding. Polypropene plastics are usually employed for the material required for the battery housing and cover. The cover of the battery is provided with a big hole at each cell for an acid filling aperture.

A drawback in the gas vault structure in the prior art, is that the provision of a gas space requires welding. Also, the inlet of the terminals needs to be effected by welding. Generally, the present state of the art requires a number of work phases, because of which the designs known in the art are unsatisfactory.

SUMMARY OF THE INVENTION

Accordingly, it is an object of the present invention to produce a gas space for a storage battery wherein the housing of the battery and/or the cover and/or the partition separating the cells are intended to be cast around a cell assembly.

This and other objects are attained by the present invention which is directed to a gas vault structure for a battery arranged to serve as an inner core for producing a gas space during casting of an envelope around the battery. The battery comprises a plurality of cells, and the envelope cast about the cells comprise an outer housing around the cells, a cover upon the cells, and partitions separating adjacent cells. Each cell contains an electrolyte and at least one of a monopolar and a bipolar plate separated from any other monopolar or bipolar plates by a separator plate, and coated with at least one of a positive active mass and negative active mass. Furthermore, electrical connectors interconnecting cells or polar plates, are provided.

Preferably, the gas vault structure is arranged to serve as an outlet for overpressure caused by air heated during the casting, and is also arranged to serve as a sealing member of the gas space, preventing entry of casting material into the gas space. Furthermore, the gas vault structure may be arranged to serve as a spacer structure in the casting, determining wall thickness of the resulting envelope.

The objectives of the present invention are achieved with a gas vault structure which is principally characterized by the gas vault structure being arranged to serve as an inner core for producing a gas space during the casting of the housing of the storage battery and/or the cover and/or the partitions separating the cells.

The gas vault structure of the present invention serves as an inner core during the casting of the housing of the storage battery and partitions separating the cells, and produces a gas space in the upper part of the cells. During the casting, the gas vault structure balances overpressure and serves as an outlet for the air heated during the casting. The gas vault structure also serves as a sealing member of the gas space, because of which the casting is not able to enter into the gas space.

The gas vault structure also comprises acid-filling apertures in which acid filling pipes have already been situated. The gas vault structure of the invention may serve, indeed, as part of the overpressure valve in a manner known in and of itself. A significant function provided by the gas vault structure of the present invention, is acting as a spacer structure during one-time casting, thus determining wall thickness of the casting because of which consumption of casting material substantially decreases. Additionally, cheaper material than casting material may be used for the gas vault structure.

BRIEF DESCRIPTION OF THE DRAWINGS

The present invention will be described in greater detail below, with reference to certain advantageous embodiments thereof presented in the accompanying drawings, to which, however, the present invention is not intended to be exclusively confined. In the drawings, FIG. 1 is a partially sectional, axonometric view of an advantageous embodiment for a storage battery provided with a gas vault structure in accordance with the present invention;

FIG. 2 is an axonometric view of an advantageous embodiment of monopolar and bipolar plates utilized in the storage battery of the present invention;

FIG. 13 is a schematic elevational view of a mobile mold structure, with the aid of which a spacer structure is pushed against a cell assembly, in accordance with the present invention;

FIG. 14 is a schematic elevational view of a mobile mold structure in a phase in which a spacer structure has been pushed against a cell assembly and the mobile mold structure begins to move away from the cell assembly, in accordance with the present invention;

FIG. 15 is a schematic elevational view of a mobile mold structure which has moved away from a cell assembly at a distance equivalent to wall thickness, of a surrounding envelope being cast, in accordance with the present invention.

DESCRIPTION OF THE PREFERRED EMBODIMENTS

Figure 3:
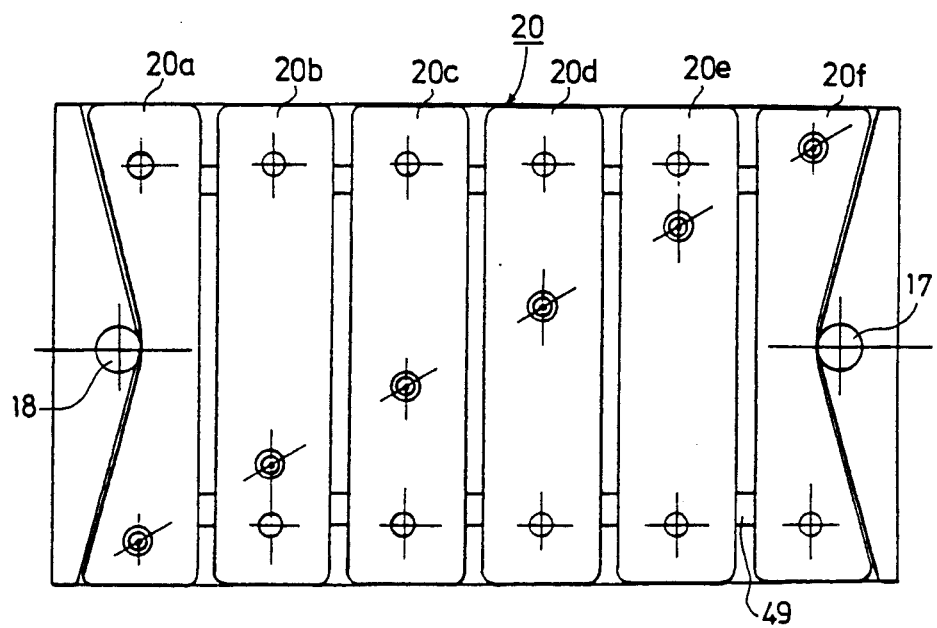
FIG. 3 is a top view of an advantageous embodiment of the gas vault structure of a 12 Volt storage battery, in accordance with the present invention.

In the embodiments illustrated in FIGS. 1–16, the cells of a storage battery 10 are indicated by reference numeral 11. Each cell 11 contains electrolyte and monopolar and/or bipolar plates separated by separator plates 14 and coated with positive and/or negative active mass.

In FIG. 1, the positive terminal of the storage battery 10 is indicated by reference numeral 17 and the negative terminal by reference numeral 18. The overpressure valve is denoted by reference numeral 19 and the gas vault structure disposed in the upper part of the cells 11 is denoted by reference numeral 20. The envelope structure of the storage battery 10 comprises a housing 21, a cover 22, and partitions 23 separating the cells 11.

A monopolar plate is denoted by reference numeral 12 in FIG. 2, with a bipolar plate being denoted by reference numeral 13. The bipolar plate 13 is coated with positive active mass 15 and negative active mass 16, while the monopolar plate 12 is merely coated with either the positive active mass 15 or the negative active mass 16. In the embodiment illustrated in FIG. 2, felt-like separator plate material in which electrolyte has been impregnated is used for the separator plates 14.

Figure 4:
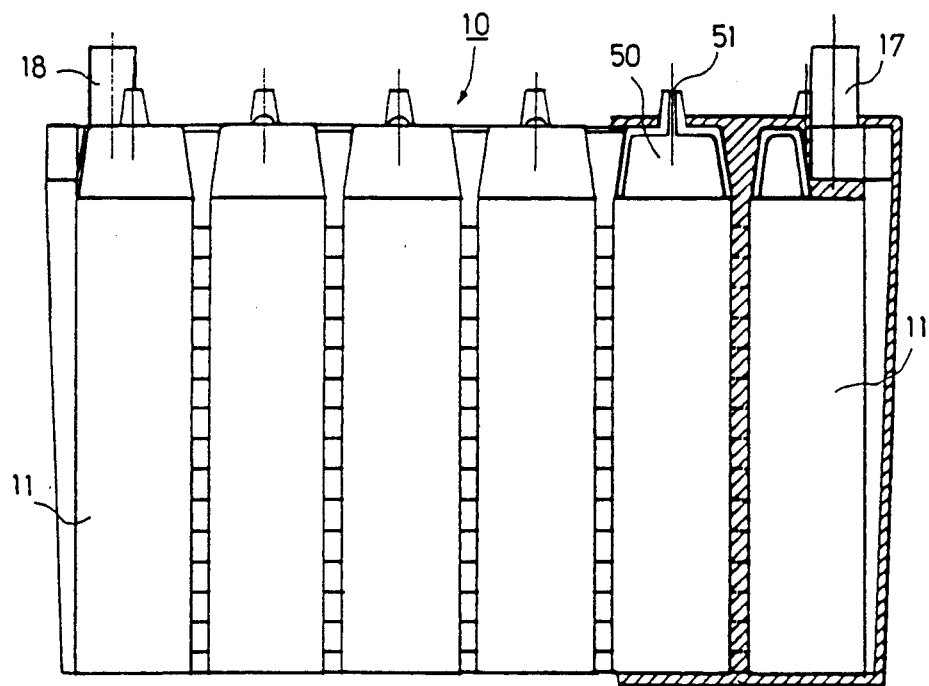
FIG. 4 is a partially sectional, elevational view of the embodiment according to FIG. 3.

The gas vault structure of the present invention is generally denoted by reference numeral 20 in FIGS. 3 and 4. In the present embodiment, the gas vault structure 20 comprises gas vaults 20a, 20b, 20c, 20d, 20e and 20f which are connected to one another with the aid of connector members 49. Each gas vault 20a–20f comprises a gas space 50 and an acid-filling aperture 51 in the upper part of the cell 11. By the same token, the gas vault structure 20 may also be constituted by separate gas vaults 20a–20f.

Figure 5:
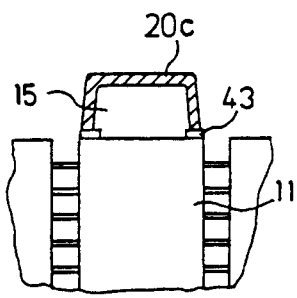
FIGS. 5 and 6 are schematic illustrations of an advantageous attachment design of a gas vault structure to a cell in accordance with the present invention.
Figure 6:
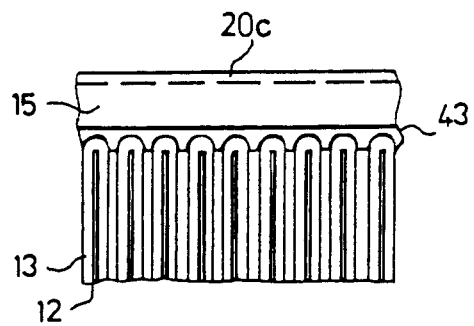

In the embodiment illustrated in FIGS. 5 and 6, the particular gas vault 20c of the gas vault structure 20 is glued to the cell 11 with a soft planar packing 43 which is tightly compressed between the cell 11 and the gas vault 20c when the cell assembly prior to casting is turned upside down in a manner further described below. In the remainder of the gas vaults 20a, 20b and 20d–20f of the gas vault structure 20, a similar soft planar packing 43 is naturally used.

Figure 7:
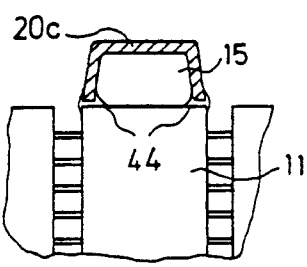
FIG. 7 is a schematic illustration of another advantageous attachment design of a gas vault structure to a cell in accordance with the present invention.

In the embodiment illustrated in FIG. 7, the gas vault 20c is glued on top of the cell 11 with glue joints 44. Naturally, a similar procedure is adopted for the remainder of the gas vaults of the gas vault structure 20.

Figure 8:
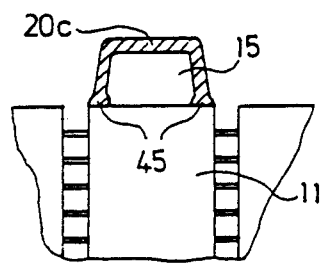
FIG. 8 is a schematic illustration of a third advantageous attachment design of a gas vault structure to a cell in accordance with the present invention.

In the embodiment of FIG. 8, the gas vault 20c is attached to the cell 11 by heating the margins of the gas vaults 20c, these margins being thereafter pressed upon the cell. In FIG. 8, the heated margins of the gas vault 20c are denoted by reference numeral 45.

Figure 9:
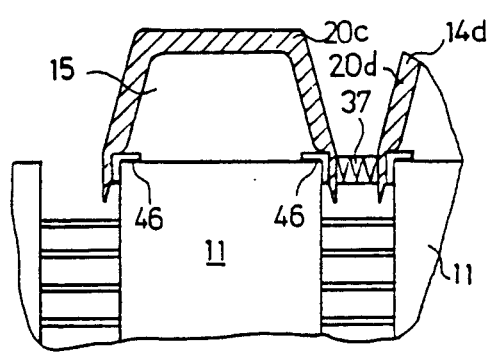
FIG. 9 is a schematic illustration of a fourth advantageous attachment design of a gas vault structure to a cell in accordance with the present invention.

In the embodiment of FIG. 9, the upper and side surfaces of the cell 11 are sealed with sealing 46. In the gas vault 20c and 20d, equivalent to the remainder of the gas vaults, the stress is directed inwardly. Alternatively, spring means 37 may be used for providing stress between the gas vaults 20c and 20d, and respectively between the other gas vaults.

Figure 10:
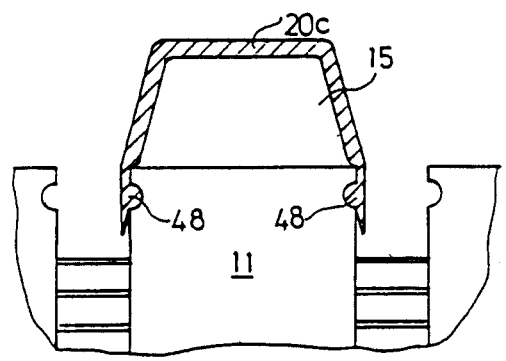
FIG. 10 is a schematic illustation of a fifth advantageous attachment design of a gas vault structure to a cell in accordance with the present invention.

In the embodiment of FIG. 10, the gas vault 20c is attached to the cell 11 by mechanical clicking joints 48. In the gas vault 20c, as well as in the other gas vaults, the stress is directed inwardly, whereby a reliable attaching is provided.

Figure 11:
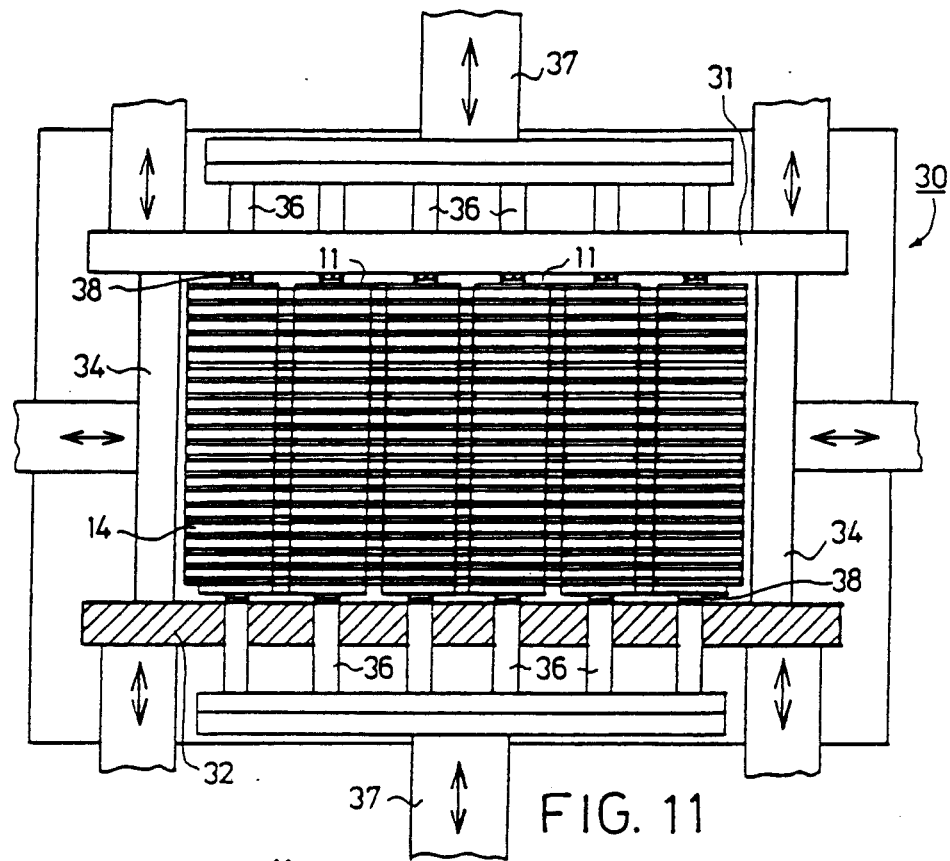
FIG. 11 is a schematic elevational view of an advantageous embodiment of a mold structure for a storage battery utilized in a casting method in accordance with the present invention.

With regard to FIGS. 1, 2 and 11 the following measures are carried out prior to casting in the most common embodiment of the present invention. The connecting straps are welded to the monopolar plates 12. The gas vaults 20 are fitted on top of the cells and the mold structure 30 is fitted around the cell assembly. The thickness of casting is determined with the aid of a spacer structure 38, this spacer structure 38 remaining inside the cast. The spacer structure 38 mediates the compression of the mold structure 30 and retains the cell assembly together, whereby the cell assembly is controlled without being bound or glued. The walls of the mold structure 30 may be either mobile or fixed.

The mold structure utilized in the casting method of a storage battery provided with a gas vault structure in accordance with the present invention is generally denoted by reference numeral 30 in FIG. 11. In this embodiment, the mold structure 30 is composed of walls 31 and 32, disposed in the direction of the sides of the storage battery 10, these walls 31 and 32 being mobile. Furthermore, the mold structure 30 comprises end walls 33 and 34 which are similarly mobile in this embodiment. The two other opposite walls of the mold structure 30 are not shown in FIG. 11.

Figure 12:
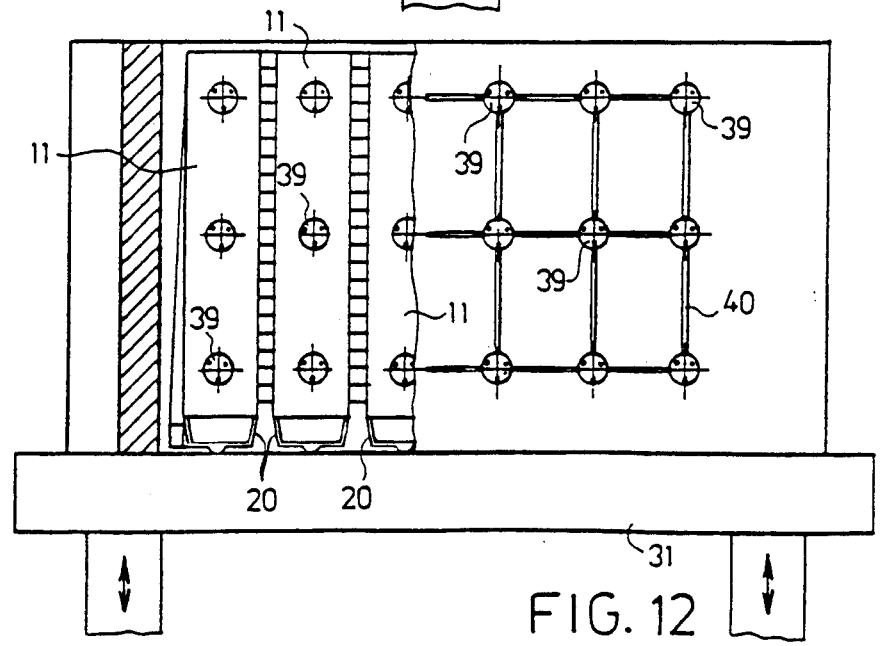
FIG. 12 is a schematic elevational view of a cell assembly provided with a gas vault structure turned upside down against a bottom plate of a mold structure, in accordance with the present invention.

Pusher means 37 provided with pins 36 are connected to the side walls 31 and 32 of the mold structure 30. In the embodiment of FIGS. 11–15, a spacer structure 38 composed of spacing washers 39 is used. The spacing washers 39 and clips 40 constitute the net-like spacer structure 38, as illustrated in FIG. 12.

The movements of the side wall 31 of the mold structure 30 can best be seen in FIGS. 13–15. In the steps shown in FIG. 13, the side wall 31 has moved in the direction indicated by arrow A and is located against the cell 11. The pins 36 and the pusher means 37 have withdrawn from the holes 35 in the side wall 31.

In the phase shown in FIG. 14, the pusher means 37 moves in the manner indicated by arrow B, whereby the pins 36 push the spacing washers 39 of the spacer structure 38 against the cell 11, while the clips 40 remain attached to the outer wall of the side wall 31 of the mold structure FIG. 11.

As shown in FIG. 15, the side wall 31 has moved in the direction indicated by arrow C, a distance determined by the spacing washers 39, whereby after the casting an envelope structure is produced for a storage battery composed of a housing 21, a cover 22, and partitions 23 FIG. 1 separating the cell 11. Finally, the clips 40 are blown off with the aid of an out-blowing system of passages 41. As best seen in FIG. 15, spacing washers 39 remain inside the cast.

According to an advantageous embodiment illustrated in FIGS. 11–15, the above-noted cell assembly is transferred to serve as an inner mold as follows. The parts 31 and 32 of the outer mold 30 disposed in the direction of the side of the storage battery 10, are urged against the sides of the cell assembly in that the assembly is compressed into its final thickness and at the same time, the cell assembly supported therewith can be transferred away from the stacking jig. Then, the terminals 17 and 18 of the storage battery 10 (FIGS. 1 and 4) can be attached to the end pieces of the set of connecting wires, e.g. by welding.

Thereafter, and with particular regard to the aforementioned FIGS. the press rods 36 pushing through the holes 35 in the side pieces 31 and 32 of the outer mold 30, while penetrating therein, first cut the spacing washers 39 provided with teeth off from their clips 40 and thereafter push the washers ahead against the sides of the cell assembly, whereby the washers start to support the cell assembly and the parts 31 and 32 of the outer mold are able to withdraw, to be situated a distance equivalent to wall thickness from the surface of the cell assembly.

Thereafter, a gas vault structure 20 is fitted above the final upper surface of the cell assembly, making it feasible to provide a gas space above the cell assembly. Thereafter, the part 31 of the outer mold 30 pushes itself in place and the terminals 17 and 18 (FIGS. 1 and 4) push themselves tightly into apertures of appropriate shape located therein (not illustrated). Also, other parts of the outer mold 30 push themselves into place. The outer mold 30 can be turned so that the storage battery 10 being cast is upside down, although this is not necessary.

Thereafter, the space between inner and outer molds is begun to be filled with material noted in Finnish Patent Application No. 855096 filed in Finland on Dec. 19, 1985 and used as a priority document for U.S. Pat. No. 4,777,101 issued Oct. 11, 1988, whereby an envelope structure for a battery comprising a housing 21, a cover 22, and partitions 23 separating the cells 11, is produced.

Figure 16:
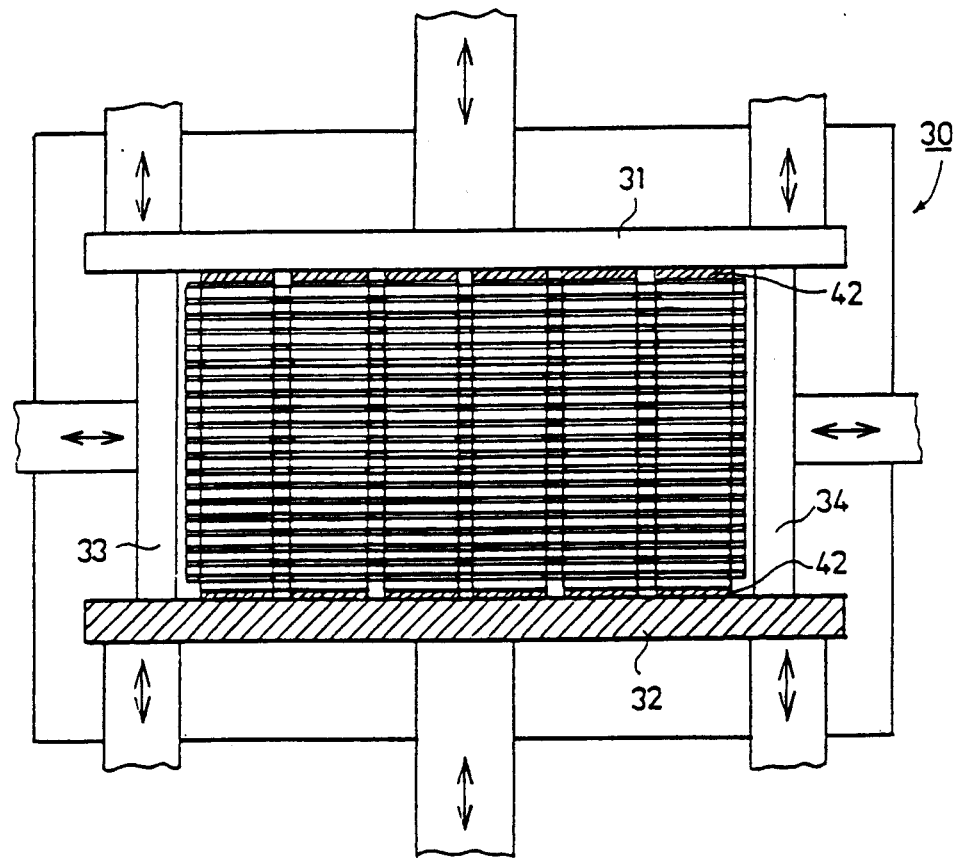
FIG. 16 is a schematic elevational view of another advantageous embodiment of a mold structure of a storage battery utilized in a casting method in accordance with the present invention.

According to another advantageous embodiment illustrated in FIG. 16, the other side part 32 of the outer mold 30 serves as a stacking jig, and the stacking is so carried out that the spacing strips 42 equivalent to the above-noted spacing washers 39 are first placed on the jig, on top of which a cell assembly is stacked. After a sufficient number of cell elements is stacked, spacing strips 42 are placed thereon, and the side pieces 31 of the outer mold 30 to be placed thereon are urged in place. The terminals 17 and 18 (FIGS. 1 and 4) are welded in place, the part 31 of the outer mold 30 pushes itself into place, the end pieces 33 and 34 of the outer mold 30 are pushed into place (or if in the same outer mold 30 several storage batteries are cast in a row, then the intermediate and end pieces of the outer mold 30 are pushed into place), and thereafter, the collecting of the cover part and the envelope structure takes place in the same manner as described in the preceding embodiment.

Only certain advantageous embodiments of the present invention have been described in the foregoing, and it is clear to one skilled in the art that numerous modifications can be accomplished in these embodiments within the scope of the inventive concepts presented above. Therefore, the preceding description of the present invention is merely exemplary, and is not intended to limit the scope thereof in any way.

What is claimed is:

1. A gas vault structure for a multi-cell battery, said gas vault structure located within a housing of said multi-cell battery, and said gas vault structure comprising:
   a plurality of gas vaults, each of said gas vaults defining a respective gas space of essentially constant predetermined volume and dimensions adjacent to each cell of said multi-cell battery such that each gas vault can function as a repository to which gas can migrate from said cells of said battery during an overpressure condition therein; and
   at least one connecting member for joining adjacent ones of said plurality of gas vaults.

2. The gas vault structure of claim 1, further comprising soft planar packing for gluing respective said gas vaults to respective said adjacent cells of said multi-cell battery.

3. The gas vault structure of claim 1, further comprising a plurality of glue joints for gluing respective gas vaults to respective said adjacent cells of said multi-cell battery.

4. The gas vault structure of claim 1, further comprising a plurality of press-heated margin elements for attaching respective said gas vaults to respective said adjacent cells of said multi-cell battery.

5. The gas vault structure of claim 1, further comprising said at least one connecting member comprising spring means which function to provide an inwardly-directed pressure upon each of said gas vaults, to which said connecting member is joined.

6. The gas vault structure of claim 1, further comprising a plurality of mechanical clicking joints for attaching respective said gas vaults to respective said adjacent gas cells of said multi-cell battery.

7. The gas vault structure of claim 1, wherein each of said gas vaults additionally has an aperture therein for acid filling.

* * * * *